Patented Dec. 14, 1937

2,101,962

UNITED STATES PATENT OFFICE 2,101,962

METHOD OF MAKING FRUIT EXTRACT CONCENTRATES AND FLAVORS

William E. Stokes, Brooklyn, and Margaret H. Kennedy, New York, N. Y., assignors by mesne assignments, to Standard Brands Incorporated, New York, N. Y., a corporation of Delaware No Drawing. Application February 18, 1936, Serial No. 64,470

9 Claims. (Cl. 99—22)

The present invention relates to a method of making fruit extract concentrates and flavors and has for a general object the provision of such a method which efficiently and economically removes the flavoring substance from fruit substances and obtains extract concentrates having a desired naturalness and brightness of color, freshness and strength of flavor.

A more specific object of the invention is the provision of such a method characterized by treatment of fruit substance, such as dried fruit or fruit pulp, with a menstruum containing an edible acid, such as tartaric, citric or other fruit acid, in sufficient amount to reduce the pH value of the extract to 2.5 or less, more completely to free the flavoring and coloring principles of the fruit; whereby concentrated extracts fresh in color and flavor, suitable for use in the preparation of gelatin desserts and other food products without requiring the supplemental addition of coloring or flavoring substances, can be readily and economically prepared without resort to costly methods of concentration, such as that performed by the use of heat, which endanger flavoring and other principles.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

Prior to the present invention it has been a common practice in the preparation of fruit extract concentrates and flavors to treat dried fruit and fresh or cold packed fruit with an alcoholic menstruum and then with a water menstruum, the resultant marc then being further pressed and extracted. The extracts obtained thereby are combined and concentrated by heat or other means. It is the usual practice to add to the extract concentrates preservatives and flavoring principles partially to restore lost flavors. With fresh fruit and cold packed fruit, the fruit usually is first pressed to remove the juice and the resultant marc is extracted with solvents which are then combined with the juice and concentrated in a similar manner. Loss of flavor, naturalness in color, freshness, etc., are characteristic of such methods due in part to incomplete freeing of the flavoring and coloring principles and a change and loss in flavor during concentration. The present invention avoids these and many other difficulties attendant upon the use of such prior art methods and its practice results in the economical production of fruit extract concentrates and flavors which have a desirable freshness and strength of flavor, intensity and brightness of color.

In the practice of the present invention fruit substances such as the dried fleshy portion of fruit, dried fruit juice, dried fruit pulp, fresh or cold packed fruit, or marc is steeped in an acidulated menstruum, preferably an aqueous menstruum which if desired may contain alcohol, acidulated preferably with fruit acid such as tartaric and/or citric, in an amount to cause the extract to have a pH value no greater than about 2.5. It has been found that fruit extracts commonly have a pH value of about 3 to 4 and that if the menstruum be acidulated to reduce the pH value to 2.5 or less the flavoring and coloring principles are more completely freed from the fibrous and/or cellular material and pass readily into the extract. The "aqueous menstruum" may contain alcohol in various amounts but it has been found in accordance with the present invention that menstruums containing more than 30% alcohol have little if any advantage over aqueous menstruums containing 30% alcohol.

The fruit substance is preferably steeped in the menstruum for a period of days, e. g. for about one week, with occasional stirring after which the resultant liquor or extract is separated from the marc in any suitable manner, for example by pressing. The resultant extract may then be used as a menstruum for the treatment of a fresh lot of fruit substance to obtain higher concentration and/or the resultant marc may be treated with fresh acidulated menstruum to obtain an extract to be added to the extract previously obtained or used for subsequent treatment of a fresh lot of fruit substance.

When fresh or cold packed fruit is used in the preparation of extract concentrates of the present invention the extraction may be carried out in a similar manner or the juice may be first extracted therefrom and the resultant marc treated with the acidulated menstruum, concentration of the extract being increased when desired by procedures similar to those outlined above. As an alternative, fresh or cold packed fruit may be pulped or pressed and then quickly dried, preferably in a vacuum drum. The resultant product consisting of dried fibrous and/or cellular material and dried fruit juice can then later be treated by the method of the present invention to obtain extracts in which the flavor and color have not been appreciably altered.

By way of example the following procedures were carried out in accordance with the present invention which gave the indicated results:

I.—Dried fruit (a) Dried raspberries _____ lbs__ 3
    Citric acid _____ ozs__ 18
    30% alcoholic menstruum _____ c. c__ 2400

The raspberries were intimately mixed with the acidulated menstruum and steeped with occasional stirring for several days. The resultant extract pressed from the marc had a pH value of not less than 2 and the yield was 2450 c. c. of extract.

(b) Dried cherries _____ lbs__ 1½
    Citric acid _____ ozs__ 4
    Water _____ c. c__ 500 were intimately mixed, steeped for seven days with occasional stirring, and the extract pressed from the marc. The yield was 610 c. c. of extract which had a pH value of 2.14.

II.—Dried fruit juice and/or dried pulp

Dried strawberry film _____ grams__ 340
Citric acid _____ ozs__ 2
30% alcoholic menstruum _____ c. c__ 1000 were intimately mixed, steeped for seven days with occasional stirring, and the extract pressed from the marc. The yield was 740 c. c. of extract having a pH value of 2.28. It was found that more complete disintegration of the fibrous and/or cellular material was obtained by the use of more acid but that in such cases it was more difficult to clarify the extract. Clarification is accomplished by filtration.

III.—Fresh or cold packed fruit

Fresh strawberries _____ lbs__ 3
Citric acid _____ ozs__ 2
30% alcoholic menstruum _____ c. c__ 500 were mixed together, the mixture being allowed to steep for seven days with occasional stirring and the extract was then pressed from the marc. The yield was 1580 c. c. of extract having a pH value of between 2.07 and 2.14.

In accordance with the present invention the concentration of the fruit extracts may be increased by using as a menstruum for a fresh lot of fruit substance the extract resulting from a previous extraction, or an extract obtained by treating the marc resulting from a previous extraction with fresh acidulated menstruum. The resultant extracts may be mixed together or added to extracts resulting from other extractions or used as menstruums for further extractions, as desired.

The objects set forth above are efficiently and economically attained by the practice of the present invention which results in the preparation of fruit extract concentrates and flavors having surprising naturalness and brightness of color, a desirable freshness and strength of flavor due to more efficient freeing of the flavoring principles, and a high yield without necessitating resort to prior art methods of concentration such as that performed with the use of heat. It was found that food products, such as gelatin desserts which have a natural fresh fruit flavor and a desired color could be prepared with the use of these fruit extract concentrates without the necessity of adding coloring agents and supplemental flavoring principles.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween, and that the term "cool" as used in the claims is intended to refer to temperatures in the neighborhood of normal atmospheric temperatures such as those encountered in so-called cold extractions as distinguished from extractions carried out with warm or hot extracting mediums.

Particularly, it is to be understood that in said claims, ingredients or compounds recited in the singular are intended to include compatible mixtures of such ingredients wherever the sense permits.

Having described our invention, what we claim as new and desire to secure by Letters Patent is:

1. A method of making fruit extract concentrates and flavors comprising steeping fruit substance in a cool acidulated menstruum to obtain an extract, the acid content of said menstruum being sufficient in amount to cause said extract to have a pH value of between about 2 and no greater than 2.5.

2. A method of making fruit extract concentrates and flavors comprising steeping fruit substance in a cool acidulated aqueous menstruum for a period of days to obtain an extract, the acid content of said menstruum being sufficient in amount to cause said extract to have a pH value of between about 2 and no greater than 2.5.

3. A method of making fruit extract concentrates and flavors comprising steeping dried fruit substance in a cool acidulated aqueous menstruum to obtain an extract, the acid content of said menstruum being sufficient in amount to cause said extract to have a pH value between about 2 and no greater than 2.5.

4. A method of making fruit extract concentrates and flavors comprising steeping fruit substance in a cool aqueous menstruum acidulated with a fruit acid to obtain an extract, the acid content of the menstruum being sufficient in amount to cause said extract to have a pH value of between about 2 and no greater than 2.5.

5. A method of making fruit extract concentrates and flavors comprising steeping fruit substances in a cool aqueous menstruum acidulated with citric acid to obtain an extract, the acid content of the menstruum being sufficient in amount to cause said extract to have a pH value between about 2 and no greater than 2.5.

6. A method of making fruit extract concentrates and flavors comprising steeping fruit substance in a cool acidulated aqueous menstruum to obtain an extract, the acid content of said menstruum being sufficient in amount to cause said extract to have a pH value of between about 2 and no greater than 2.5, and utilizing said extract as a cool menstruum for steeping a fresh lot of fruit substance to obtain a second extract.

7. A method of making fruit extract concentrates and flavors comprising steeping dried fruit substance in a cool acidulated aqueous menstruum to obtain an extract, the acid content of said menstruum being sufficient in amount to cause said extract to have a pH value of between about 2 and no greater than 2.5, and utilizing said extract as a cool menstruum for steeping a fresh lot of fruit substance to obtain a second extract.

8. A method of making fruit extract concentrates and flavors comprising steeping fruit substance in a cool acidulated aqueous menstruum to obtain an extract, the acid content of said menstruum being sufficient in amount to cause said extract to have a pH value between about 2 and no greater than 2.5, separating the extract from the resultant marc, and steeping said marc in a cool acidulated aqueous menstruum to obtain a second extract for use as a menstruum for steeping a fresh lot of fruit substance.

9. A method of making fruit extract concentrates and flavors comprising steeping dried fruit substance in a cool acidulated aqueous menstruum to obtain an extract, the acid content of said menstruum being sufficient in amount to cause said extract to have a pH value between about 2 and no greater than 2.5, separating the extract from the resultant marc, and steeping said marc in a cool acidulated aqueous menstruum to obtain a second extract for use as a menstruum for steeping a fresh lot of fruit substance.

WILLIAM E. STOKES.
MARGARET H. KENNEDY.